(12) United States Patent
Smith et al.

(10) Patent No.: US 9,051,028 B2
(45) Date of Patent: Jun. 9, 2015

(54) AUTONOMOUS HULL INSPECTION

(71) Applicant: Raytheon Company, Waltham, MA (US)

(72) Inventors: Fraser M. Smith, Salt Lake City, UT (US); Brian J. Maclean, Salt Lake City, UT (US); Glenn Colvin, Park City, UT (US)

(73) Assignee: Raytheon Company, Waltham, MA (US)

( * ) Notice: Subject to any disclaimer, the term of this patent is extended or adjusted under 35 U.S.C. 154(b) by 57 days.

(21) Appl. No.: 13/769,339

(22) Filed: Feb. 17, 2013

(65) Prior Publication Data

US 2014/0076225 A1    Mar. 20, 2014

Related U.S. Application Data

(60) Provisional application No. 61/701,512, filed on Sep. 14, 2012, provisional application No. 61/701,517, filed on Sep. 14, 2012, provisional application No. 61/701,523, filed on Sep. 14, 2012, provisional application No. 61/701,529, filed on Sep. 14, 2012, provisional application No. 61/701,534, filed on Sep. 14, 2012, provisional application No. 61/701,537, filed on Sep. 14, 2012.

(51) Int. Cl.
| | |
|---|---|
| *B63B 17/00* | (2006.01) |
| *B63B 59/10* | (2006.01) |
| *B63B 59/06* | (2006.01) |

(Continued)

(52) U.S. Cl.
CPC ............... *B63B 17/00* (2013.01); *Y10S 901/01* (2013.01); *Y10S 901/41* (2013.01); *B63B 59/10* (2013.01); *B63B 59/06* (2013.01); *Y10S 901/44* (2013.01); *B63B 9/00* (2013.01); *B63B 59/08* (2013.01); *B62D 55/265* (2013.01); *B62D 55/32* (2013.01); *B63G 8/001* (2013.01); *G05D 1/00* (2013.01);

(Continued)

(58) Field of Classification Search
CPC ...... G01N 29/11; G01N 29/225; B63C 11/42; B63C 11/00; B63B 59/00; B63B 59/06; B63B 59/10; B63G 8/001; G05D 1/00
USPC ............ 114/222, 313, 337; 367/96, 117, 127, 367/129, 131

See application file for complete search history.

(56) References Cited

U.S. PATENT DOCUMENTS

| | | |
|---|---|---|
| 2,104,062 A | 1/1938 | Temple |
| 2,132,661 A | 10/1938 | Temple |

(Continued)

FOREIGN PATENT DOCUMENTS

| | | |
|---|---|---|
| CN | 2405719 | 11/2000 |
| CN | 2552648 | 5/2003 |

(Continued)

OTHER PUBLICATIONS

A Copenhagen Climate Treaty; Version 1.0 Draft; A Proposal for a Copenhagen Agreement by Members of the NGO Community; published Jun. 2009; pp. 1-78 (80 pages total).

(Continued)

*Primary Examiner* — Lars A Olson

(57) ABSTRACT

A hull inspection robot for autonomously inspecting a hull includes a robot body and a drive subsystem onboard the robot for driving and maneuvering the robot about the hull. An autonomous inspection system non-destructively inspects the hull by detecting a state of or near a portion of the hull and comparing the detected state with a stored state of the portion of the hull.

26 Claims, 14 Drawing Sheets

(51) Int. Cl.
*B63B 9/00* (2006.01)
*B63B 59/08* (2006.01)
*B62D 55/265* (2006.01)
*B62D 55/32* (2006.01)
*B63G 8/00* (2006.01)
*G05D 1/00* (2006.01)
*G05D 1/02* (2006.01)

(52) U.S. Cl.
CPC ........ *G05D 1/021* (2013.01); *G05D 2201/0203* (2013.01)

(56) References Cited

U.S. PATENT DOCUMENTS

| | | | |
|---|---|---|---|
| 2,386,650 A | 10/1945 | Bell | |
| 3,088,429 A | 5/1963 | Johannessen | |
| 3,285,676 A | 11/1966 | Hetteen | |
| 3,439,937 A | 4/1969 | Dixon | |
| 3,554,300 A | 1/1971 | Rosenberg | |
| 3,638,600 A | 2/1972 | Modrey | |
| 3,682,265 A | 8/1972 | Hiraoka et al. | |
| 3,777,834 A | 12/1973 | Hiraoka et al. | |
| 3,906,572 A | 9/1975 | Winn | |
| 3,922,991 A | 12/1975 | Woods | |
| 3,934,664 A | 1/1976 | Pohjola | |
| 3,946,692 A | 3/1976 | Sierra et al. | |
| 3,960,229 A | 6/1976 | Shio | |
| 3,984,944 A | 10/1976 | Maasberg et al. | |
| 4,046,429 A | 9/1977 | Pohjola | |
| 4,079,694 A | 3/1978 | Galinou | |
| 4,119,356 A | 10/1978 | Pohjola | |
| 4,135,492 A | 1/1979 | Heitland | |
| 4,135,592 A | 1/1979 | Wincent | |
| 4,202,453 A | 5/1980 | Wilkes | |
| 4,251,791 A | 2/1981 | Yanagisawa et al. | |
| 4,401,048 A | 8/1983 | Rogers | |
| 4,444,146 A | 4/1984 | DeWitz et al. | |
| 4,574,722 A | 3/1986 | Orita et al. | |
| 4,674,949 A | 6/1987 | Kroczynski | |
| 4,690,092 A | 9/1987 | Rabuse | |
| 4,697,536 A | 10/1987 | Hirata | |
| 4,697,537 A | 10/1987 | Smith | |
| 4,734,954 A | 4/1988 | Greskovics et al. | |
| 4,736,826 A | 4/1988 | White et al. | |
| 4,788,498 A | 11/1988 | Uemura | |
| 4,789,037 A | 12/1988 | Kneebone | |
| 4,809,383 A | 3/1989 | Urakami | |
| 4,841,894 A | 6/1989 | Nellessen, Jr. | |
| 4,890,567 A | 1/1990 | Caduff | |
| 4,926,775 A | 5/1990 | Andorsen | |
| 5,048,445 A | 9/1991 | Lever et al. | |
| 5,174,222 A | 12/1992 | Rogers | |
| 5,203,646 A | 4/1993 | Landsberger et al. | |
| 5,249,631 A | 10/1993 | Ferren | |
| 5,253,605 A | 10/1993 | Collins | |
| 5,253,724 A | 10/1993 | Prior | |
| 5,285,601 A | 2/1994 | Watkin et al. | |
| 5,366,038 A | 11/1994 | Hidetsugu et al. | |
| 5,378,994 A * | 1/1995 | Novak et al. | 324/671 |
| 5,435,405 A | 7/1995 | Schempf et al. | |
| 5,569,371 A | 10/1996 | Perling | |
| 5,628,271 A | 5/1997 | McGuire | |
| 5,831,432 A * | 11/1998 | Mohri | 324/249 |
| 5,849,099 A | 12/1998 | McGuire | |
| 5,852,984 A | 12/1998 | Matsuyama et al. | |
| 5,894,901 A | 4/1999 | Awamura et al. | |
| 5,947,051 A | 9/1999 | Geiger | |
| 6,000,484 A | 12/1999 | Zoretich et al. | |
| 6,053,267 A | 4/2000 | Fisher | |
| 6,064,708 A | 5/2000 | Sakamaki | |
| 6,102,145 A | 8/2000 | Fisher | |
| 6,125,955 A | 10/2000 | Zoretich et al. | |
| 6,209,473 B1 * | 4/2001 | Jones et al. | 114/222 |
| 6,276,478 B1 | 8/2001 | Hopkins et al. | |
| 6,317,387 B1 * | 11/2001 | D'Amaddio et al. | 367/129 |
| 6,564,815 B2 | 5/2003 | McGuire | |
| 6,595,152 B2 | 7/2003 | McGuire | |
| 6,698,375 B2 | 3/2004 | Delfossie | |
| 6,698,376 B2 | 3/2004 | Delahousse et al. | |
| 6,792,335 B2 | 9/2004 | Ross et al. | |
| 6,886,486 B2 | 5/2005 | Van Rompay | |
| 6,886,651 B1 | 5/2005 | Slocum et al. | |
| 6,974,356 B2 | 12/2005 | Hobson | |
| 7,286,214 B2 | 10/2007 | Reinersman et al. | |
| 7,290,496 B2 | 11/2007 | Asfar et al. | |
| 7,296,530 B1 | 11/2007 | Bemstein et al. | |
| 7,390,560 B2 | 6/2008 | Wallach | |
| 7,496,226 B2 | 2/2009 | Negahdaripour et al. | |
| 7,520,356 B2 | 4/2009 | Sadegh et al. | |
| 7,866,421 B2 | 1/2011 | Moore et al. | |
| 7,934,575 B2 | 5/2011 | Waibel et al. | |
| 8,214,081 B2 | 7/2012 | Choi et al. | |
| 8,342,281 B2 | 1/2013 | Rooney, III | |
| 8,386,112 B2 | 2/2013 | Rooney, III | |
| 8,393,286 B2 | 3/2013 | Rooney, III et al. | |
| 8,393,421 B2 | 3/2013 | Kornstein et al. | |
| 8,723,536 B2 * | 5/2014 | Miyazaki et al. | 324/750.01 |
| 2003/0000445 A1 | 1/2003 | McGuire | |
| 2004/0089216 A1 | 5/2004 | Van Rompay | |
| 2004/0133999 A1 | 7/2004 | Walton | |
| 2004/0250934 A1 | 12/2004 | Hamdan | |
| 2005/0027412 A1 | 2/2005 | Hobson et al. | |
| 2005/0156562 A1 | 7/2005 | Cohen et al. | |
| 2005/0199171 A1 | 9/2005 | Ecklund | |
| 2005/0216125 A1 | 9/2005 | Huston et al. | |
| 2006/0175439 A1 | 8/2006 | Steur et al. | |
| 2006/0191457 A1 | 8/2006 | Murphy | |
| 2006/0249622 A1 | 11/2006 | Steele | |
| 2006/0261772 A1 | 11/2006 | Kim | |
| 2007/0089916 A1 | 4/2007 | Lundstrom | |
| 2007/0276552 A1 | 11/2007 | Rodocker et al. | |
| 2007/0284940 A1 | 12/2007 | Koolhiran | |
| 2008/0009984 A1 | 1/2008 | Lee et al. | |
| 2008/0202405 A1 | 8/2008 | Kern | |
| 2008/0276407 A1 | 11/2008 | Schnittman | |
| 2008/0281470 A1 | 11/2008 | Gilbert et al. | |
| 2008/0300821 A1 | 12/2008 | Frank et al. | |
| 2008/0308324 A1 | 12/2008 | Moser et al. | |
| 2009/0078484 A1 | 3/2009 | Kocijan | |
| 2009/0094765 A1 | 4/2009 | Osaka et al. | |
| 2009/0166102 A1 | 7/2009 | Waibel et al. | |
| 2009/0301203 A1 | 12/2009 | Brussieux | |
| 2010/0000723 A1 | 1/2010 | Chambers | |
| 2010/0126403 A1 | 5/2010 | Rooney, III et al. | |
| 2010/0131098 A1 | 5/2010 | Rooney, III et al. | |
| 2010/0217436 A1 | 8/2010 | Jones et al. | |
| 2010/0219003 A1 | 9/2010 | Rooney, III et al. | |
| 2010/0238050 A1 | 9/2010 | Rhodes et al. | |
| 2011/0050374 A1 | 3/2011 | Dvorak | |
| 2011/0067615 A1 | 3/2011 | Rooney, III et al. | |
| 2011/0083599 A1 | 4/2011 | Kornstein et al. | |
| 2011/0208417 A1 | 8/2011 | Fink et al. | |
| 2011/0282536 A1 | 11/2011 | Rooney, III | |
| 2012/0006352 A1 | 1/2012 | Holappa et al. | |
| 2012/0215348 A1 | 8/2012 | Skrinde | |
| 2014/0076223 A1 | 3/2014 | Smith | |
| 2014/0076224 A1 | 3/2014 | Smith | |
| 2014/0076225 A1 | 3/2014 | Smith | |
| 2014/0076226 A1 | 3/2014 | Smith | |
| 2014/0077587 A1 | 3/2014 | Smith | |
| 2014/0081504 A1 | 3/2014 | Smith | |
| 2014/0090906 A1 | 4/2014 | Kornstein et al. | |

FOREIGN PATENT DOCUMENTS

| | | |
|---|---|---|
| CN | 1864944 A | 11/2006 |
| CN | 101387687 A | 3/2009 |
| DE | 3611750 | 10/1987 |
| FR | 1352056 A | 2/1964 |
| FR | 2861457 A1 | 4/2005 |
| FR | 2948920 A1 | 2/2011 |
| GB | 2038721 | 7/1980 |
| GB | 2103162 | 2/1983 |

(56) References Cited

FOREIGN PATENT DOCUMENTS

| | | |
|---|---|---|
| GB | 2165330 A | 4/1986 |
| JP | S48-014096 | 2/1973 |
| JP | S49-001434 | 1/1974 |
| JP | S50-012797 | 2/1975 |
| JP | S50-81487 U | 7/1975 |
| JP | 58-012075 | 1/1983 |
| JP | S58-14096 | 1/1983 |
| JP | S60-131174 | 7/1985 |
| JP | S62-130999 | 8/1987 |
| JP | 04-002592 | 1/1992 |
| JP | H05-19086 | 1/1993 |
| JP | 06-099888 | 4/1994 |
| JP | 08-310384 | 11/1996 |
| JP | H10-16884 | 1/1998 |
| JP | 2003025265 | 1/2003 |
| JP | 2005-335882 | 12/2005 |
| WO | WO 99/07489 A1 | 2/1999 |
| WO | WO 02/074611 A2 | 9/2002 |
| WO | WO 02/074611 A3 | 9/2002 |
| WO | WO 2005/014387 | 2/2005 |
| WO | WO 2010/059195 | 5/2010 |
| WO | WO 2010/134022 A1 | 11/2010 |
| WO | WO 2011/022037 | 2/2011 |
| WO | WO 2011015786 A1 | 2/2011 |
| WO | WO 2011/034558 | 3/2011 |
| WO | WO 2011/046592 | 4/2011 |
| WO | WO 2011/142800 | 11/2011 |
| WO | WO 2011/146103 | 11/2011 |
| WO | WO 2012/104109 A1 | 8/2012 |

OTHER PUBLICATIONS

Anti-Fouling Systems; Focus on IMO, International Maritime Organization; UK; 2002; pp. 1-31; http://www.uscg.mil/hq/cg5/cg522/cg5224/docs/FOULING2003.pdf.

Borchardt; Grooming the Fleet, Biofouling Slows Vessels and Wastes Fuels, so the Navy is Looking at an Underwater Robot to Keep its Hulls Shipshape; Mechanical Engineering; Apr. 2010; pp. 33-35; vol. 132, No. 4.

Fernandez; NAFTA and Member Country Strategies for Maritime Trade and Marine Invasive Species; Journal of Environmental Management; 2008; pp. 308-321; vol. 89.

Garelick, et a; RTI International EnSys Energy & Systems, Inc.; Navigistics Consulting; Global Trade and Fuels Assessment—Future Trends and Effects of Designating Requiring Clean Fuels in the Marine Sector: Task Order No. 1; Draft Report; RTI Project No. 0209701.001; Apr. 2006; 82 pages.

HISMAR; HISMAR News Report No. 2; 2008; http://hismar.ncl.ac.uk/public_docs/News_Reports/News%20Report%20No2_UNEW.pdf; 4 pages.

HISMAR; Hull Identification System for Maritime Autonomous Robots; http://hismar.ncl.ac.uk/public_docs/HISMAR_Poster.pdf; 1 page.

Kohli; Biofouling and Design of a Biomimetic Hull-Grooming Tool; Naval Surface Warfare Center Carderock Division; West Bethesda; MD; NSWCCD-CISD-2007/002; Ship Systems Integration & Design Department Technical Report; Sep. 2007; 38 pages.

Man; B&W, Basic Principles of Ship Propulsion; Basics of Ship Propulsion; Apr. 2004; pp. 1-30.

Munk; Fuel Conservation Through Managing Hull Resistance; Motorship Propulsion Conference; Copenhangen; Apr. 26, 2006; pp. 1-10.

Paik et al.; Condition Assessment of Aged Ships; Proceedings of the 16$^{th}$ International Ship and Offshore Structures Congress; Dec. 31, 2006; pp. 273-283; vol. 2; The 16$^{th}$ International Ship and Offshore Structures Congress, Southampton, UK.

Preiser et al.; Energy (Fuel) Conservation Through Underwater Removal and Control of Fouling on Hulls of Navy Ships, Naval Research and Development Center, Materials Department, Annapolis, Research and Development Report, Dec. 1975; 52 pages.

Reed et al; Automatic Ship Hull Inspection Using Unmanned Underwater Vehicles; Proceedings from the 7$^{th}$ International Symposium on Technology and the Mine Problem; Monterey, USA; May 2006; 10 pages.

Rosenhahn et al; Advanced Nanostructures for the Control of Biofouling: the FP 6 EU Integrated Project AMBIO; Biointerphases; Mar. 2008; Published Feb. 21, 2008; pp. IR1-IR5; vol. 3; No. 1.

Serene et al; Design of a Remotely Operated Vehicle (ROV) for Underwater Ship Hull Cleaning; National University of Singapore; pp. 1-6; 2003.

Tallett et al; Potential Marine Fuels Regulations: Impacts on Global Refining; Costs & Emissions; Joint IFQC & IPIECA Roundtable; Impacts of $CO_2$ Emissions form Refining & Shipping; London, England; Oct. 1, 2007; 17 pages.

Townsin; The Ship Hull Fouling Penalty; Biofouling; Jan. 2003; pp. 9-15; vol. 19 (supplement).

Vaganay et al; Ship Hull Inspection with the HAUV: US Navy and NATO Demonstrations Results; Oceans 2006; Sep. 2006; pp. 1-6.

Yuan et al.; The Design of Underwater Hull-Cleaning Robot; Journal of Marine Science and Application; Jun. 2001; pp. 41-45; vol. 3; No. 1.

Written Opinion of the International Searching Authority, International Application No. PCT/US2011/000787, Jul. 20, 2011, 7 pgs. (unnumbered).

Written Opinion of the International Searchign Authority, International Application No. PCT/US2011/000770, Aug. 9, 2011, 5 pgs. (unnumbered).

Written Opinion of the International Searching Authority, International Application No. PCT/US2010/002163, Oct. 13, 2010, 5 pgs. (unnumbered).

Written Opinion of the International Searching Authority, International Application No. PCT/US2010/002164. Oct. 8, 2010, 5 pgs. (unnumbered).

Written Opnion of the International Searching Authority for PCT Application No. PCT/US2009/006122 mailed Feb. 3, 2010 9 (seven pages).

Written Opinion of the International Searching Authority, International Application No. PCT/US2010/002693, Dec. 9, 2010, 8 pages (unnumbered).

PCT Application PCT/US2010/02693; filing date Oct. 6, 2010; Raytheon Company; International Search Report mailed Dec. 9, 2010.

PCT Application PCT/US2011/000787 filing date May 5, 2011; James H. Rooney; International Search Report mailed Jul. 20, 2011.

PCT Application PCT/US2011/000770; filing date May 3, 2011; James H. Rooney III; INternationa Search Report mailed Aug. 9, 2011.

PCT Application PCT/US2010/002163; filing date Aug. 4, 2010; James H. Rooney; International Search Report mailed Oct. 13, 2010.

PCT Application PCT/US2010/002164; filing date Aug. 4, 2010; James H. Rooney; International Search Report mailed Oct. 8, 2010.

PCT Application PCT/US2009/006122; filing date Nov. 16, 2009; James H. Rooney III; International Search Report mailed Feb. 3, 2010.

PCT Application PCT/US2013/059552; filing date Sep. 12, 2013; Raytheon Company; International Search Report mailed Dec. 20, 2013.

PCT Application PCT/US2013/059552; filing date Sep. 12, 2013; Raytheon Company; International Search Report mailed Feb. 21, 2014.

PCT Application PCT/US2013/059527; filing date Sep. 12, 2013; Raytheon Company; International Search Report mailed Mar. 3, 2014.

PCT Application PCT/US2013/059548; filing date Sep. 12, 2013; Raytheon Company; International Search Report mailed Apr. 16, 2014.

PCT Application PCT/US2013/059551; filing date Sep. 12, 2013; Raytheon Company; International Search Report mailed Mar. 10, 2014.

PCT Application PCT/US2013/059546; filing date Sep. 12, 2013; Raytheon Company; International Search report mailed Jan. 20, 2014.

(56) References Cited

OTHER PUBLICATIONS

PCT Application PCT/US2013/059527; filing date Sep. 12, 2013; Raytheon Company; International Search Report mailed May 13, 2014.
PCT Application PCT/US2013/059550; filing date Sep. 12, 2013; Raytheon Company; International Search Report mailed Jun. 3, 2014.
PCT Application PCT/US2013/059548; filing date Sep. 12, 2013; Raytheon Company; International Search Report mailed Jun. 30, 2014.
EP Application EP09827853; filed Aug. 11, 2011; Raytheon Company; Supplemental European Search Report Apr. 23, 2014.
U.S. Appl. No. 12/313,643, filed Nov. 21, 2008; James H. Rooney III; office action dated Sep. 17, 2012.
U.S. Appl. No. 12/583,346, filed Aug. 19, 2009; James H. Rooney III; office action dated Sep. 25, 2012.
U.S. Appl. No. 12/313,643, filed Nov. 21, 2008; James H. Rooney III; office action issued Apr. 13, 2012.
U.S. Appl. No. 12/586,248, filed Sep. 18, 2009; James H. Rooney III office action issued May 24, 2012.
U.S. Appl. No. 12/587,949, filed Oct. 14, 2009; Howard R. Kornstein; office action issued May 25, 2012.
U.S. Appl. No. 12/800,174, filed May 10, 2010; James H. Rooney III; office action issued Feb. 24, 2012.
U.S. Appl. No. 12/583,346, filed Aug. 19, 2009; James H. Rooney, III; office action dated Feb. 27, 2013.
U.S. Appl. No. 12/583,346, filed Aug. 19, 2009; James H. Rooney III; office action dated Feb. 27, 2014.
U.S. Appl. No. 12/586,248, filed Sep. 18, 2009; James H. Rooney III; office action mailed Dec. 13, 2011.
U.S. Appl. No. 12/586,248, filed Sep. 18, 2009; James H. Rooney III; Notice of Allowance issued Oct. 24, 2012.
U.S. Appl. No. 12/587,949, filed Oct. 14, 2009; Howard R. Kornstein; notice of allowance mailed Sep. 21, 2012.
U.S. Appl. No. 12/800,486, filed May 17, 2010; James H. Rooney III; notice of allowance dated Sep. 27, 2012.
U.S. Appl. No. 12/800,174; dated May 10, 2010; James H. Rooney III; notice of allowance dated Aug. 17, 2012.
U.S. Appl. No. 13/313,643, filed Nov. 21, 2008; James H. Rooney III; office action dated Feb. 26, 2014.
U.S. Appl. No. 13/794,594, filed Mar. 11, 2013; Howard R. Kornstein; office action dated May 1, 2014.
U.S. Appl. No. 13/794,594, filed Mar. 11, 2013; Howard R. Kornstein; office action dated Oct. 15, 2014.
U.S. Appl. No. 13/769,344, filed Feb. 17, 2013; Fraser M. Smith; office action dated Oct. 28, 2014.
U.S. Appl. No. 12/313,643, filed Nov. 21, 2008; James H. Rooney III; office action dated Aug. 25, 2014.
U.S. Appl. No. 12/583,346, filed Aug. 19, 2009; James H. Rooney III; office action dated Aug. 26, 2014.
U.S. Appl. No. 13/769,337, filed Feb. 17, 2013; Fraser M. Smith; office action dated Sep. 3, 2014.
U.S. Appl. No. 13/769,342, filed Feb. 17, 2013; Fraser M. Smith; office action dated Sep. 10, 2014.
U.S. Appl. No. 13/769,345, filed Feb. 17, 2013; Fraser M. Smith; office action dated Sep. 16, 2014.
Hover et al.; A Vehicle System for Autonomous Relative Survey of In-Water Ships; Marine Technology Society Journal; Jul. 2007; pp. 44-55; vol. 41, No. 2; Marine Technology Society, Washington, D.C.
Menegaldo et al.; Development and Navigation of a Mobile Robot for Floating Production Storage and Offloading Ship Hull Inspection ; IEEE Transactions on Industrial Electronics; Sep. 2009; pp. 3717-3722; vol. 56, No. 9; IEEE Service Center, Piscataway, New Jersey.
Vaganay et al.; Hovering Autonomous Underwater Vehicle-System Design Improvements and Performance Evaluation Results; 30$^{th}$ International Symposium on Unmanned Untethered Submarine Technology; Jul. 9, 2009; pp. 1-14.
EP Application 11783852.4; filing date May 5, 2011; Raytheon Company; European Search Report; dated Aug. 18, 2014.
U.S. Appl. No. 13/769,337, filed Feb. 17, 2013; Fraser M. Smith; Notice of Allowance mailed Feb. 10, 2015.
U.S. Appl. No. 13/769,345, filed Feb. 17, 2013; Fraser M. Smith; Notice of Allowance mailed Jan. 12, 2015.
U.S. Appl. No. 13/794,594, filed Mar. 11, 2013; Howard R. Kornstein; office action dated Mar. 4, 2015.
U.S. Appl. No. 13/769,344, filed Feb. 17, 2013; Fraser M. Smith; office action dated Mar. 10, 2015.
U.S. Appl. No. 13/769,342, filed Feb. 17, 2013; Fraser M. Smith; office action dated Mar. 10, 2015.
U.S. Appl. No. 12/313,643, filed Nov. 21, 2008; James H. Rooney III; office action dated Apr. 8, 2015.
U.S. Appl. No. 12/583,346, filed Aug. 19, 2009; James H. Rooney III; office action dated Apr. 8, 2015.

* cited by examiner (1)
AUTONOMOUS HULL INSPECTION

RELATED APPLICATIONS

This application claims the benefit of the following provisional patent applications, the contents of each of which are incorporated herein by reference in their entirety: U.S. provisional patent application Ser. No. 61/701,512, filed on Sep. 14, 2012; U.S. provisional patent application Ser. No. 61/701,517, filed on Sep. 14, 2012; U.S. provisional patent application Ser. No. 61/701,523, filed on Sep. 14, 2012; U.S. provisional patent application Ser. No. 61/701,529, filed on Sep. 14, 2012; U.S. provisional patent application Ser. No. 61/701,534, filed on Sep. 14, 2012; and U.S. provisional patent application Ser. No. 61/701,537, filed on Sep. 14, 2012.

This application is related to copending nonprovisional U.S. patent applications Ser. Nos. 13/769,337, filed on Feb. 17, 2013, and entitled "Hull Robot for Autonomously Detecting cCleanliness of a Hull"; U.S. patent application Ser. No. 13/769,342, filed on Feb. 17, 2013, and entitled "Autonomous Hull Navigation" U.S. patent application Ser. No. 13/769,344, filed on Feb. 17, 2013, and entitled "Hull Cleaning Robot"; U.S. patent application Ser. No. 13/769,345, filed on Feb. 17, 2013, and entitled "Hull Robot With Hull Separation Countermeasures"; and U.S. patent application Ser. No. 13/769,346, filed on Feb. 17, 2013, and entitled "Magnetic Track", the contents of each of which is hereby incorporated by reference herein in their entirety.

This application is also related to the following copending U.S. patent application Ser. No. 12/313,643, filed on Nov. 21, 2008; Ser. No. 12/583,346, filed on Aug. 19, 2009; Ser. No. 12/586,248, filed on Sep. 18, 2009; Ser. No. 12/587,949, filed on Oct. 14, 2009; and Ser. No. 12/800,486 filed on May 17, 2010; the contents of each of which is hereby incorporated herein by reference in their entirety.

BACKGROUND

The structural integrity of a vessel hull is an important safety and economical concern. For example, frictional resistance due to buildup on or fouling of the hull by algae, sea grass, barnacles, and the like as a vessel moves through the water can significantly increase the fuel consumption of the vessel. As an example, an added resistance of 30% due to moderate bio-fouling of a tanker hull can increase the fuel consumption of the vessel by up to twelve tons per day. The result is added cost to operate the vessel, as well as increased emissions. Moreover, monitoring of the hull to detect damage is useful in determining when and where repairs should be made.

A variety of methods are currently employed to reduce the likelihood of bio-fouling, and/or to monitor the structural integrity of the hull. For example, typically, while the ship is dockside and/or during normal unlading conditions, the hull can be periodically inspected manually, such as by scuba divers using various equipment. The cost of such an inspection procedure can be costly. This type of inspection effort is also typically repeated at a predetermined rate, such as every ten to twenty months or sooner, particularly if there is suspicion of damage to the vessel hull. To properly inspect the vessel hull, the hull often must first be cleaned. As a complication, however, some jurisdictions have made dockside cleaning illegal due to the release of contaminates into the water, and particularly particles of anti-fouling paint which is toxic, and which has been found to contaminate the water.

SUMMARY

In an exemplary embodiment, a hull inspection robot for autonomously inspecting a hull includes a robot body and a drive subsystem onboard the robot for driving and maneuvering the robot about the hull. An autonomous inspection system can non-destructively inspect the hull by detecting a state of, or near, a portion of the hull and comparing the detected state with a stored state of the same portion of the hull.

In an exemplary embodiment, a method for autonomously inspecting a hull with a robot can similarly include autonomously maneuvering the robot about the hull, detecting a state of, or near, a portion of the hull, and comparing the detected state with a stored state of the portion of the hull.

In an exemplary embodiment, an autonomous hull inspection system can include a non-destructive detector onboard a robotic or other device navigable over or about a hull of a vessel. A database can be supported onboard the device and in communication with the detector. The database can store hull inspection data obtained by the detector, such as that previously obtained. An inspection standard module can be in communication with the detector and the database. The inspection standard module can establish a hull standard state by storing in the database the hull inspection data obtained by the detector. An inspection module can be in communication with the detector and the database. The inspection module can store in the database the hull inspection data obtained by the detector after the hull standard state has been established by the inspection standard module to identify a current hull state. A processor onboard the device can be in communication with the database and can compare the hull standard state with a current hull state to effectuate or facilitate one or more further purposes or functions.

DETAILED DESCRIPTION

Figure 1:
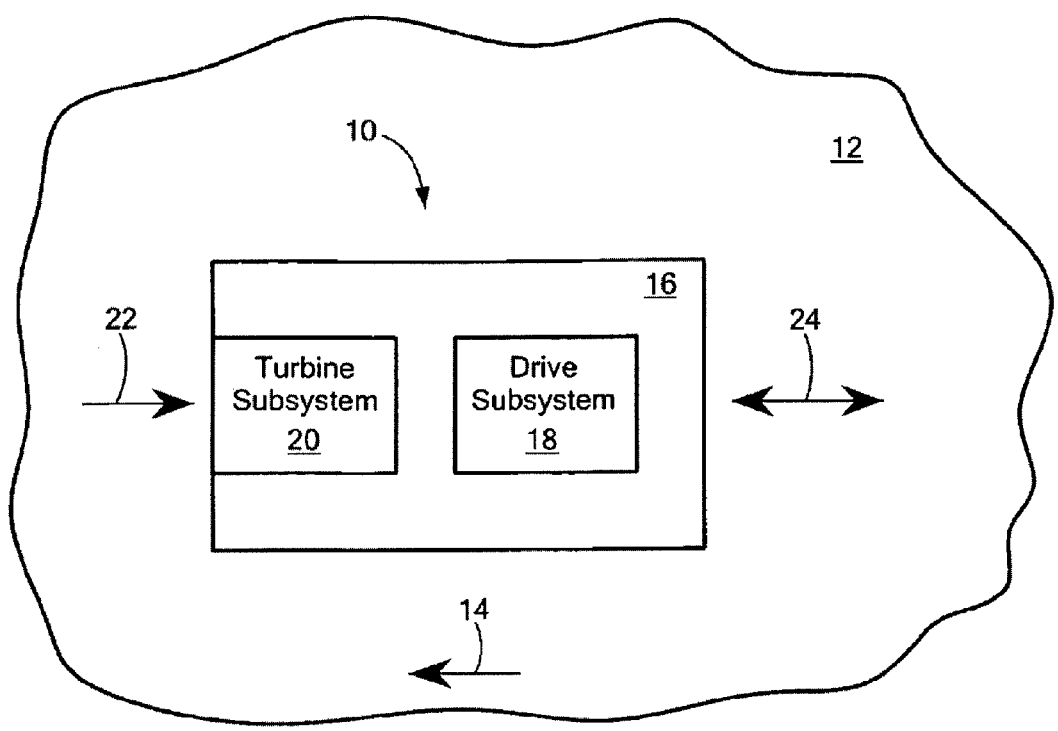
FIG. 1 is a block diagram of a hull robot in accordance with an embodiment of the present technology.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

The following terminology will be used in accordance with the definitions set forth below.

As used herein, "robot body" is intended as a broad term to define one or more structural components (e.g., a frame, chassis, covering or shell, etc.) capable of supporting one or more other components of a hull robot or its subsystems, and/or capable of providing covering and/or concealment of one or more components or subsystems of the hull robot.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

EXAMPLE EMBODIMENTS

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

It is noted in the present disclosure that when describing the system, or the related devices or methods, individual or separate descriptions are considered applicable to one another, whether or not explicitly discussed in the context of a particular example or embodiment. For example, in discussing an energy harvester configuration per se, the device, system, and/or method embodiments are also included in such discussions, and vice versa.

Furthermore, various modifications and combinations can be derived from the present disclosure and illustrations, and as such, the following figures should not be considered limiting.

Various systems and methods have been proposed for inspecting a surface of a hull of a vessel. However, such systems and methods often presuppose a knowledge or expectation that a hull state has experienced a change or degradation due to corrosion, collision, fouling, or any of a number of other causes. For example, in some methods manual inspection is performed to determine whether and to what extent a hull state has changed. As referred to herein, a "hull state" (or variations thereof) refers to a condition, quality, or aspect of a hull or a portion of a hull in terms of a definable or measurable feature of the hull. For example, a state of the hull may include a shape of the hull; the presence or absence of paint, the presence or absence of a biolayer, or another layer on the hull; a magnetic, sonic, ultrasonic, electrical, or optical signature of the hull; and so forth. Further the "hull state" may broadly refer to changes in the hull state which are detected with a suitable detector, as described herein. For example, a change in the hull state may include a deformation in the hull shape, a loss of paint, formation of a biolayer, a change in magnetic response about the hull, and so forth.

With previous systems and methods, routine inspection operations may be scheduled periodically without respect to an actual state of the hull. In other words, there is often an assumption that after the period of time has elapsed the state of the hull may have changed and a costly inspection should be initiated to identify the change and determine its impact. In some instances, cleaning, painting, and other preventative or reparative maintenance procedures are not begun until an inspection has been performed. However, the inspection process can be time consuming and expensive. These and other shortcomings can result in inefficiencies and an ineffective use of resources.

In one example, a hull inspection robot is described herein which addresses the deficiencies of previous systems and methods. In one example, a hull inspection robot for autonomously inspecting a hull can include a robot body and a drive subsystem onboard the robot for facilitating driving and maneuvering the robot about the hull. An autonomous inspection system can non-destructively, or even in some cases non-invasively, inspect the hull by detecting a state of or near a portion of the hull and comparing the detected state with a stored state of the portion of the hull. By non-invasively or non-destructively it is meant that detection can be done in a manner so as to not damage the surface of the ship's hull, or the paint layer covering the hull. The hull inspection robot can optionally be configured to perform additional operations, such as cleaning, painting, and so forth. The hull inspection robot can be configured to perform such additional operations while substantially simultaneously performing an inspection operation. Indeed, the various inspection systems described herein can be combined with a hull cleaning function or operation or sequence, and can be carried out either coincident with cleaning or separately. Further, these functions can be carried out and accomplished by a single robot appropriately equipped or configured. Further, the inspection and/or other operations can be performed either while the vessel is docked or while the vessel is in motion or travelling through a body of fluid, such as an ocean, sea, lake, or other body of water.

The following examples illustrate embodiments of the present technology in which inspection hardware and functionality are incorporated into a hull cleaning robot. However, the application or implantation of the technology described herein is not limited to such embodiments and may be implemented separately from a hull cleaning robot or may be integrated with any other suitable type of device for use on the hull of a vessel.

FIG. 1 illustrates what is representative of a robot 10 on a vessel hull 12 (e.g., a ship) underway in the direction of vector 14. Robot body 16 houses a drive subsystem 18 and a turbine subsystem 20. Fluid (e.g., water) moves past hull 12 in the direction of vector 22 due to the motion of the vessel. In accordance with the subject invention, the turbine subsystem 20 is actuatable (e.g., driven) by the moving fluid and used to operate at least a drive subsystem 18. In an example not shown in FIG. 1, a water wheel subsystem may be used in place of the turbine subsystem to operate the drive subsystem.

The result is a robot able to maneuver, at a minimum, about hull 12 as shown by arrows 24. Furthermore, the robot is typically able to maneuver in one or more controlled paths about the hull, which are not necessarily aligned with vector 14 and which are in addition to the directions shown by arrows 24. The robot can be powered by the action of the water flowing past the hull while the vessel is underway. In this way, cleaning and/or inspection and the like can be undertaken even continuously while the vessel is in operation. The robot can thus be configured to harvest energy for operation from the action of a fluid flowing past the robot.

Typically, other subsystems can be included as components of robot 10, for example, a cleaning subsystem, a navigation subsystem, a communications subsystem, and the like. Moreover, although certainly possible in some embodiments, in many embodiments the robot body 16 need not be tethered to any kind of power or control subsystem. The turbine subsystem can operate drive subsystem 18 (and, in one example, a cleaning subsystem) directly or via a generator charging a power subsystem (e.g., a battery pack) which supplies power to one or more motors driving the drive subsystem and/or the cleaning subsystem. The battery pack can also be used to energize the other electronic and/or electromechanical subsystems associated with the robot. In one aspect, the generator may drive one or more motors directly.

Figure 2:
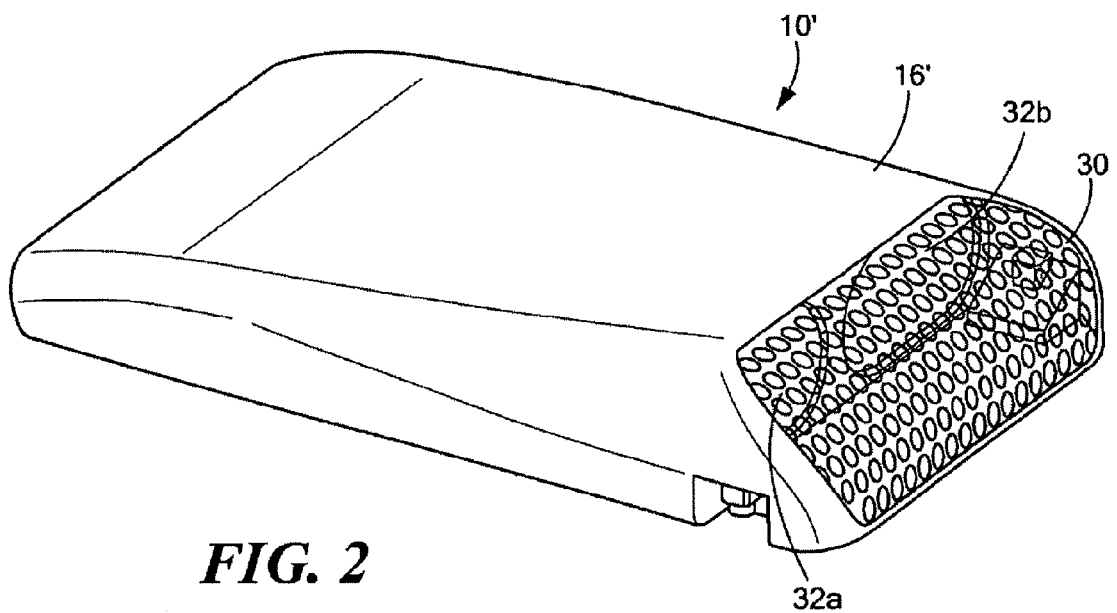
FIG. 2 is a top perspective view of a hull robot in accordance with an embodiment of the present technology.

In one particular example, the robot 10', shown in FIG. 2, includes a body 16' with a flow inlet filter screen 30. Body 16 can comprise any number of hydrodynamic or other shapes or configurations. As such, the shape or configuration illustrated is not meant to be limiting in any way. The shape can be designed to urge the robot against the hull, when the robot is deployed on the hull, as water moves over the robot due to the action of the vessel moving through the water. In other words, depending upon the particular hydrodynamics of the robot, water passing over the robot can induce a downward force on the robot that increases the force being applied by the robot against the hull, thus helping to secure the robot to the hull.

Figure 3:
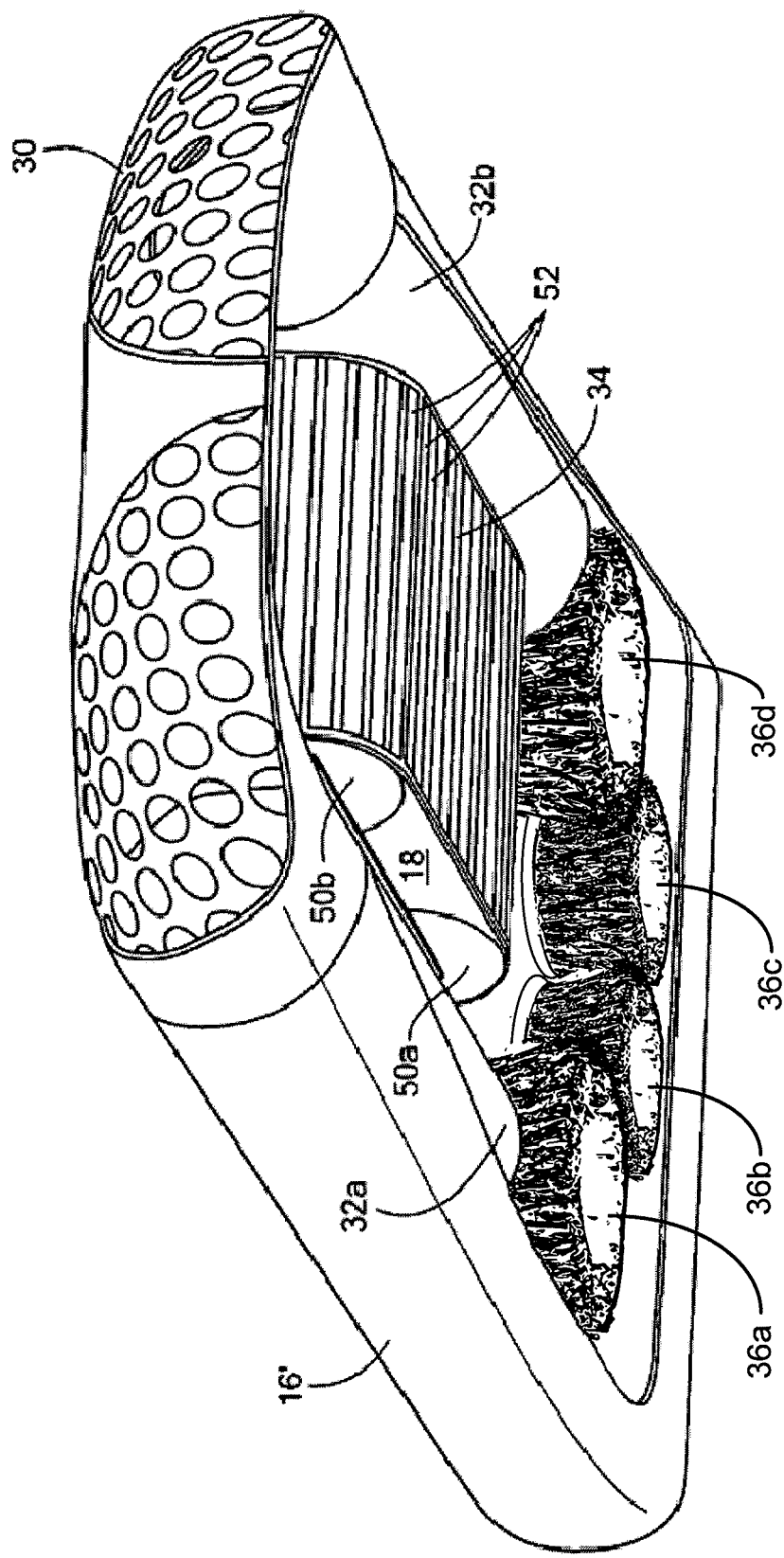
FIG. 3 is a bottom perspective view of a hull robot in accordance with an embodiment of the present technology.

Referring to FIG. 3, the intakes of turbines 32a and 32b can be behind screen 30. The intakes of turbines 32a and 32b can be exposed, via screen 30, to fluid moving past the hull. In this example, robot housing 16 is approximately thirty-six inches long, twenty-four inches wide, and six inches tall.

Figure 4:
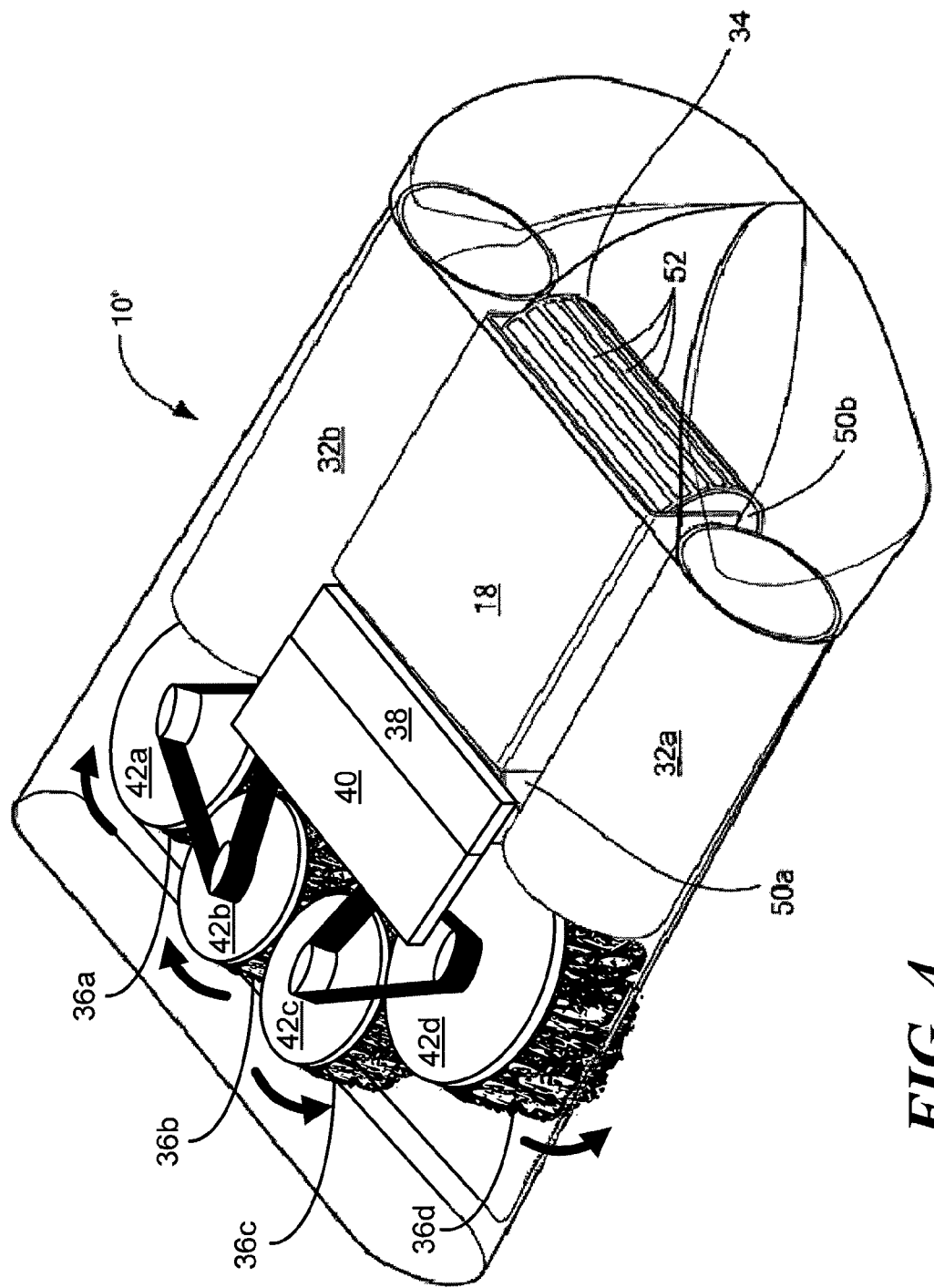
FIG. 4 is a top perspective view of a hull robot in accordance with an embodiment of the present technology where a robot body is hidden for illustrative purposes.

The drive subsystem in this example includes at least one drive track 34 configured to facilitate locomotion of the robot 10 about the hull, and to hold the robot on the hull as the robot maneuvers. In one aspect, multiple drive tracks may be provided. Cleaning brushes 36a-36d can be included for cleaning the hull of the vessel. A battery pack and/or electronic control module can also be included. The brush(es) may be driven by gear drives, which may in turn be driven by the shaft of one of the turbines 32a or 32b, or by a motor in an embodiment where the shaft of turbine 32b drives a generator providing power to battery pack for the operation of the motor. For example, FIG. 4 illustrates an embodiment where the cleaning brushes 36-36d are rotated using a belt and pulley system actuated by the motor 40 (which may be powered by power source 38), where some brushes 36a-36b counter-rotate relative to other brushes 36c-36d. Any number of brushes or cleaning elements may be used to suit a particular application, such as a greater or lesser number of brushes, for example. Other cleaning subsystems are also contemplated. For example, the robot could include a squeegee, a passive cleaning pad, water jets, and the like. Where a passive cleaning apparatus is used, power in the form of electricity or torque generated by the turbine subsystem would not generally be used to operate the cleaning apparatus.

Turbine 32a can be used to drive a track roller directly in the case where the shaft of turbine 32a is coupled to roller via a drive train. But, preferably, the shaft of turbine 32a is coupled to a generator powering motor which drives the track roller.

In one example, an endless belt 34 is disposed over rollers 50a and 50b and includes magnets and/or magnetic materials 52 embedded (e.g., encapsulated) in the material of the belt, which can be made of rubber. Such a magnetic belt may effectively secure the robot to the hull of the vessel. Other magnetic subsystems used to engage a robot with the hull of a vessel are also contemplated.

In a specific example, the shaft of turbine 32a is coupled to a drive train which drives track roller, and the shaft of turbine 32b is coupled to another drive train which drives one or more cleaning brushes via belts and pulleys or gearing. Other means for operating the at least one drive track and the cleaning apparatus are also contemplated. For example, the shaft of the turbine, or the drive train to which the turbine is coupled, may be coupled to a battery or energy harvesting device.

Whether used in driving the robot, operating the cleaning brushes, or providing any other desired functionality, power stored on or generated by the robot can be used to perform inspection tasks as well. Specifically, the inspection tasks may include hull integrity inspection operations where the structural integrity of the hull is inspected.

Hull integrity inspections may be conducted in any of a variety of methods using any of a variety of devices or systems. The methods and/or devices or systems may be used individually or in combination with one another, and may be used as stand-alone inspection procedures or with cleaning, painting, or other desired procedures or operations. In other words, the hull inspection technology may be a stand-alone variant to inspect hulls, may be affixed temporarily to a hull cleaning robot or other device, or may be part of a system with other hull cleaning elements. In one example, a hull inspection system 40, as shown in the cutaway view of FIG. 4, may be utilized by a robot to implement one or more hull inspection technologies for the purpose of inspecting the hull.

Some non-exhaustive example technologies for hull integrity inspection contemplated herein include acoustic emission-based detection (e.g., ultrasonic, below ultrasonic frequency (less than 20 kHz), etc.), eddy current detection, magnetic field detection, displacement gauges, and optical detection (which can involve interferometry and/or visual inspection). Additional example inspection technologies contemplated herein can include paint integrity inspection (such as by way of optical/visual detection), conduction detection, capacitance detection, and so forth. The hull inspection routines carried out can be non-invasive or nondestructive.

It is noted herein that hull integrity inspection about a vessel hull can be carried out using any one of the systems and methods discussed herein. Moreover, in some applications, it may be necessary to employ multiple different types of inspection systems, and their associated inspection methods, in the event a single inspection system and method is found insufficient for whatever reason. As such, simultaneous, successive or redundant use of combinations of inspection systems and methods are contemplated herein.

In accordance with one exemplary embodiment, acoustic emission-based inspection systems may be employed to inspect the hull of a vessel, and/or to inspect the paint covering or applied to the hull of the vessel while the drive subsystem of the robot drives and maneuvers the robot about the hull. In one embodiment, the acoustic emission-based inspection system can comprise an ultrasonic inspection system, which may be considered a form of non-destructive inspection. In ultrasonic inspection, an ultrasound transducer connected to a diagnostic machine (both of which may be supported on the inspection robot) is passed over the hull, wherein very short ultrasonic pulse-waves with center frequencies ranging from 0.1-50 MHz can be directed into the hull to detect internal flaws or to characterize hull properties. Ultrasonic inspection can also be used to determine a thickness of the hull, for example, to monitor corrosion. The transducer may be separated from the hull by a couplant, wherein the couplant facilitates transmission of the ultrasonic energy from the transducer into the hull. While oil as a couplant may be used in some examples, the couplant is preferably water, due to the likely immersion of the robot under water on the vessel in motion.

Figure 5:
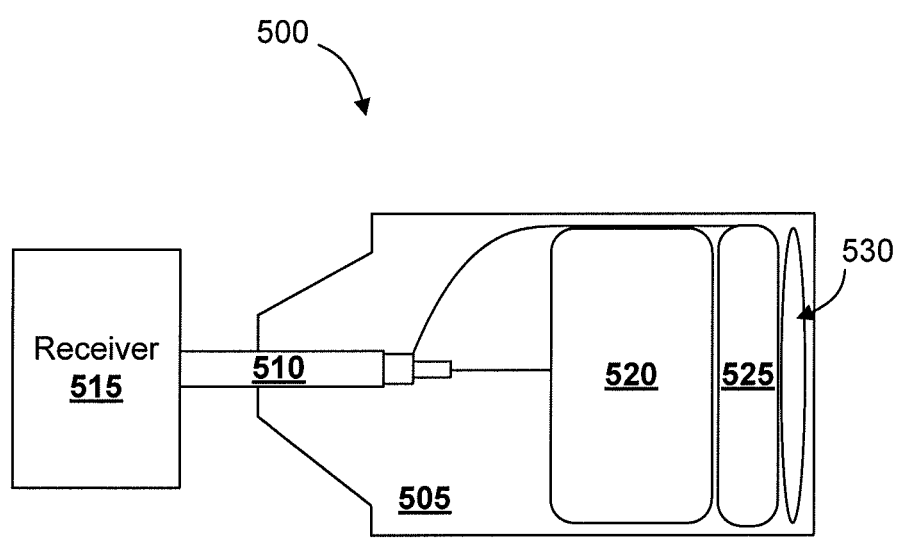
FIG. 5 is a block diagram of an ultrasonic detector in accordance with an example of the present technology.

With reference to FIG. 5, a case 505 is shown enclosing various components of the ultrasonic inspection device 500 or probe (i.e., the hull inspection system 40 of FIG. 4). A cable 510 carries a power supply when the probe is transmitting, and carries signals back to a receiver 515 when receiving. A backing 520 can be supported within the case 505, or otherwise provided, that can be a sufficiently dense and attenuating material used to control the vibration of a transducer 525 by absorbing the energy that radiates from the back face of the transducer, which provides desired inspection resolution. A reflected ultrasonic beam is picked up by the piezoelectric transducer and generates a signal to be processed by the receiver. The receiver or diagnostic machine can essentially include a processor, memory, and computer readable instructions for processing the received signal, and the receiver can be included in the inspection system described above. Optionally, an acoustic lens 530 can also be included for focusing or otherwise treating sound waves output from the transducer or reflected back to the transducer. More detailed aspects of ultrasonic technology for use in other applications are known and are not discussed here, but are nonetheless contemplated as will be readily recognized by those having skill in the art.

Methods or modes of receiving the ultrasonic energy or waveform can include reflection and attenuation modes. In the reflection mode (otherwise known as the pulse-echo mode), the transducer sends and receives pulsed ultrasonic waves. The ultrasonic waves are reflected off of the hull back to the receiver or diagnostic machine. Reflected ultrasonic waves result from an interface with the hull, such as with the back wall of the hull or an imperfection within the hull. The diagnostic machine can store the results in the form of a signal with an amplitude representing the intensity of the reflection and the distance of signal travel as determined by a speed of the ultrasonic signal and an amount of time from when the signal was emitted to when the signal was received at the receiver 515 after reflecting from the hull.

In the attenuation mode (otherwise known as the through-transmission mode), a transmitter sends ultrasonic energy through one surface of the hull, and a separate receiver on another surface detects an amount of ultrasonic energy traveling through the hull. Imperfections or other conditions in the space between the transmitter and receiver reduce the amount of ultrasonic energy transmitted, thus revealing the presence of such imperfections or conditions. The couplant increases the efficiency of the process by reducing the losses in the ultrasonic wave energy due to separation between the surfaces.

Ultrasonic inspection can be highly penetrating, allowing the detection of flaws deep in the hull. Ultrasonic inspection also enables the detection of extremely small flaws. Ultrasonic inspection can be used to estimate a size, orientation, shape and nature of a defect in the hull.

Those skilled in the art will recognize that other acoustic emission-based inspection systems may be employed, such as those that operate at frequencies lower than ultrasonic (e.g., lower than 20 kHz).

Figure 6:
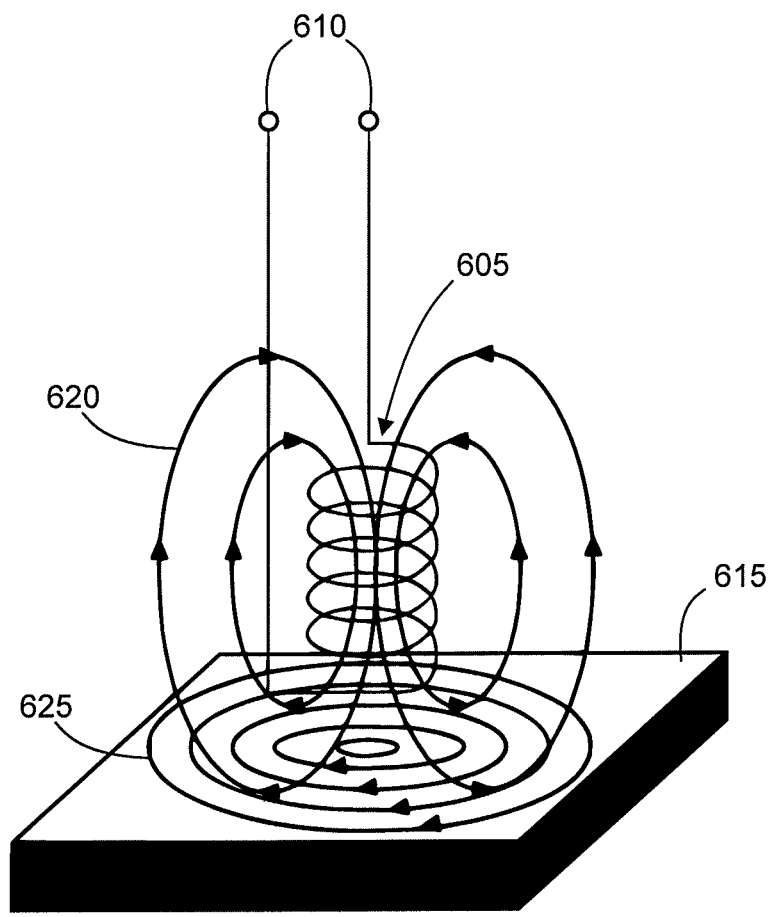
FIG. 6 is a perspective view of an eddy current detector in accordance with an example of the present technology.

Reference will now be made to FIG. 6. Eddy current inspection is another form of inspection technology contemplated herein. In one exemplary embodiment, eddy current inspection can utilize electromagnetic induction to detect flaws in the hull. Generally a circular coil 605 (i.e., a primary excitation coil) carrying current via electrodes 610 can be placed in proximity to the hull 615. An alternating current in the coil can create a changing magnetic field, represented by lines 620, which interacts with the hull and generates an eddy current, represented by lines 625. Variations in the phase and magnitude of the generated eddy currents can be monitored using a receiver coil (not shown), or by measuring changes to the current flowing in the primary excitation coil. Variations in the electrical conductivity or magnetic permeability of the hull, or the presence of any flaws, will cause a change in eddy current and a corresponding change in the phase and amplitude of the measured current. Eddy-current testing can detect very small cracks in or near the surface of the hull. Eddy current inspection techniques can also be employed for making electrical conductivity and thickness measurements of the hull or coatings on the hull (such as with respect to paint, for example). The conductivity measurements can be used for material identification, heat damage detection, case depth determination, and heat treatment monitoring, for example.

Figure 7:
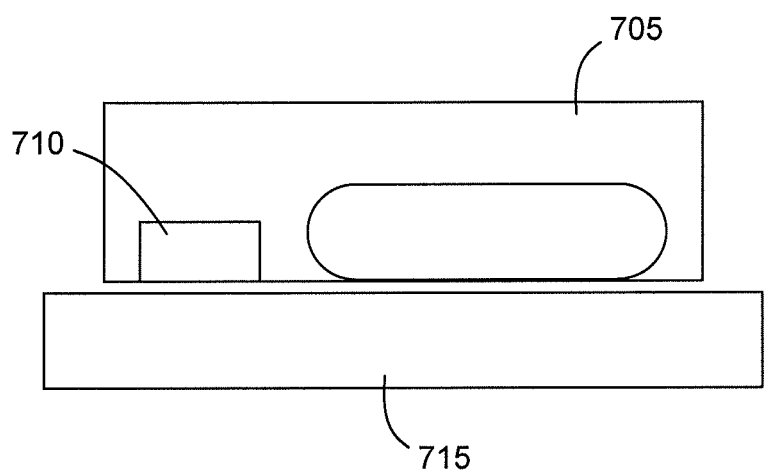
FIG. 7 is a side view of a magnetic detector in accordance with an example of the present technology.

Reference will now be made to FIG. 7, in which is illustrated a hull inspection system utilizing magnetic fields. For magnetic field inspection, the hull robot 705 can be configured with a compass, magnetometer 710, or gauss meter which, rather than creating a magnetic field as in the eddy current inspection, detects a magnetic field or magnetic attraction present in the hull 715. Various magnetic fields can be detected about different portions of the hull that are known or believed to be in sound condition. These magnetic fields detected at different positions on the hull can be stored in a database for later comparison with subsequent readings. Subsequently, when the magnetometer is passed over the hull again, a magnetic response of the hull at a particular location can be compared with the stored magnetic response of the same location to determine whether there is a change in response. A change in response could be indicative of damage to the hull. This change in response can trigger one or more other types of inspection, automatic or manual, to confirm or further determine the nature of the change in response, and the presence of possible hull discrepancies.

Figure 8:
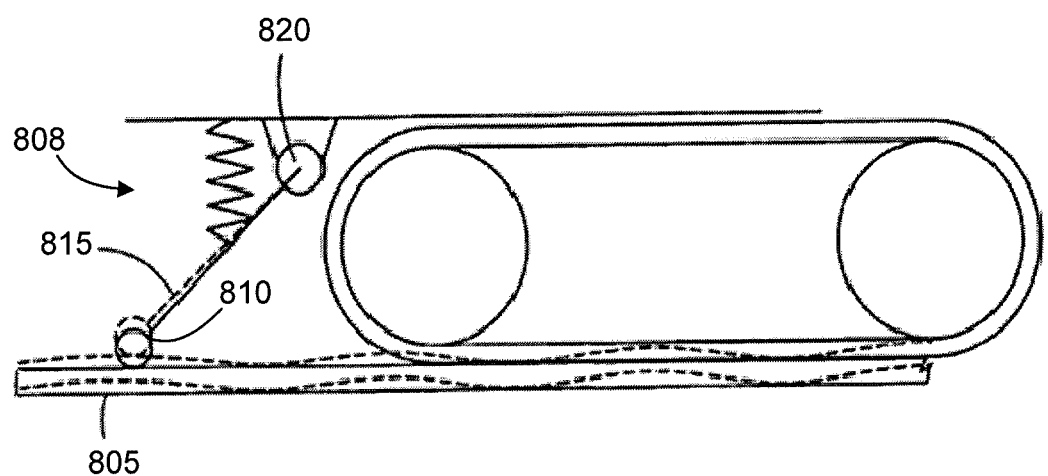
FIG. 8 is a side view of a hull robot including a displacement gauge in accordance with an example of the present technology.

In another inspection embodiment shown in FIG. 8, one or more displacement gauges can be used to monitor a shape or configuration of the surface of the hull. For example, a probe 808 associated with the robot can include a roller 810, an arm 815, and a sensor 820 or switch responsive to the arm. The probe can be pivotally or otherwise dynamically supported about the robot, and biased in a direction towards the hull 805 using a biasing element, such as a spring. When the roller raises or lowers due to a contour of the hull 805, the sensor can detect this event and an inspection module, as part of the inspection system, can be configured to store the event in a database. Subsequent inspections can include referencing the data stored in the database, and comparing the stored data to the current inspection readings to identify whether a change in the hull contour at a particular location has occurred.

Figure 9:
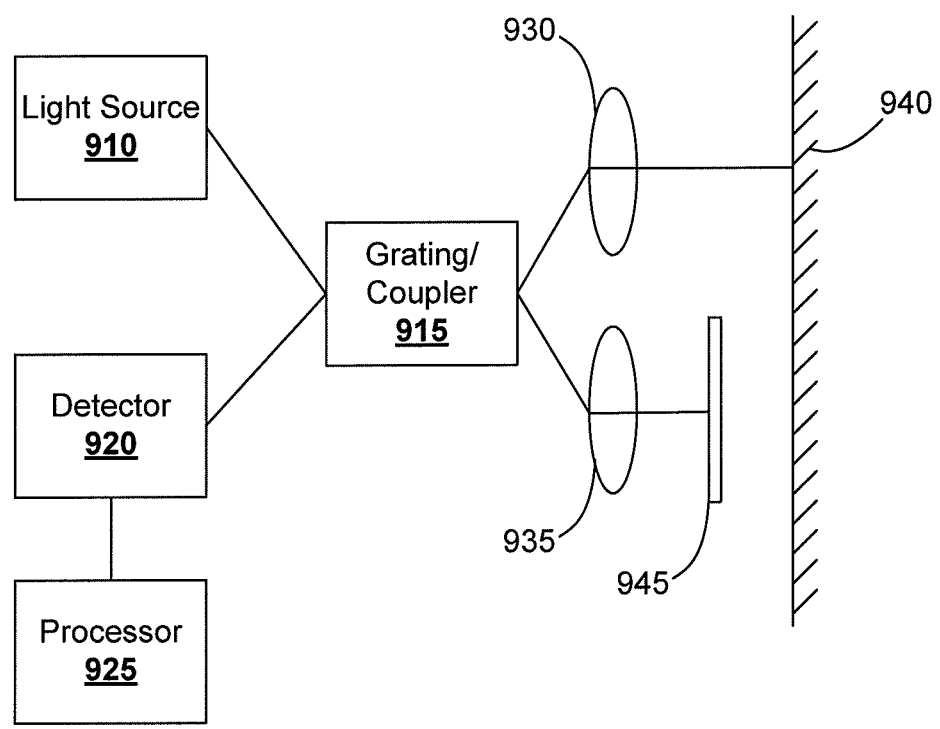
FIG. 9 is a block diagram illustrating optical interferometry inspection in accordance with an example of the present technology.

In an exemplary optical inspection embodiment shown in FIG. 9, interferometry can be used to inspect the hull. Interferometry makes use of the principle of superposition to combine separate electromagnetic waves in a way that will cause the result of the combination of these waves to have some meaningful property that is diagnostic of the original state of the waves. This works because when two waves with the same frequency combine, the resulting pattern is determined by the phase difference between the two waves—waves that are in phase will undergo constructive interference while waves that are out of phase will undergo destructive interference.

In one example, a single beam of coherent light from a light source 910 can be split into two identical beams by a grating 915 or a partial mirror. Each of these beams can travel a different route, called a path, until the beams are recombined at the coupler 915 before arriving at a detector 920. The path difference, the difference in the distance traveled by each beam, creates a phase difference between them. It is this introduced phase difference that creates the interference pattern between the initially identical waves. If a single beam has been split along two paths, the phase difference is diagnostic of anything that changes the phase along the paths. For example, a physical change in the path length or a change in the refractive index along the path may result in such a phase difference. The phase difference between the two beams results in a change in the intensity of the light on the detector. The resulting intensity of the light after the mixing of these two light beams can be measured.

In terms of specific application to the hull, a light source 910 can emit a beam of light which is split into multiple beams using a beam grating 915. One of the beams is directed at the surface of the hull 940 of the vessel and the other is directed at a mirror 945. The beams can reflect from the hull and the mirror. The beams may optionally be conditioned by one or more lenses 930, 935, respectively, before and/or after direction to the hull or mirror and/or reflection therefrom. The beams can be combined or coupled together using a coupler 915 and directed towards a detector 920. The beam intensity signal detected can be stored in a database. A processor 925 can be used to compare a previous detected interferometric signal from a particular location on the hull with a current detected signal to determine whether the signal has changed. A change in signal may be representative of a change in structural integrity of the hull, or any other change in condition of the hull. The change in signal can trigger automatic inspection using one or more other inspection techniques to better ascertain the nature of the change, or can trigger an alert to a user that a manual inspection in a particular location is desired.

In one aspect, the coupler and the beam splitter, or grating, can be separate devices. In another aspect, the coupler and beam splitter, or grating, can be a same device. For example, a beam splitter or grating device can be silvered on one side to couple the reflected beams together when the beams approach from the silvered side of the device, and can operate to split the beams when the beams approach from the non-silvered side of the device.

Figure 10:
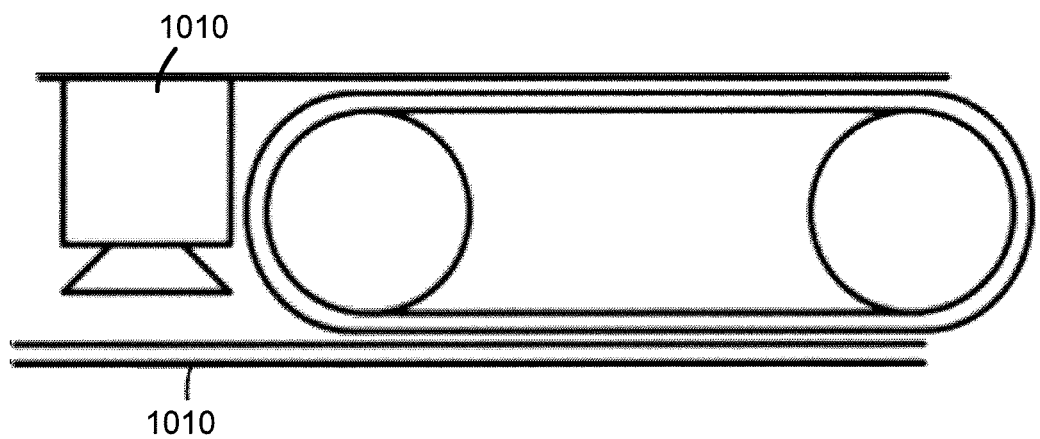
FIG. 10 is a cross-sectional side view of a hull robot with a camera in accordance with an embodiment of the present technology.

In another exemplary embodiment, and with reference now to FIG. 10, optical inspection can include inspection using imaging technologies. For example, the optical inspection device can include an optical detector, such as a camera 1010, configured to detect light (including ultraviolet, visible, near infrared, infrared, etc.) reflective off of the hull 1005. Various technologies exist for detecting cracks, irregularities, abnormalities, and the like in an image. Such technologies can be applied to analyzing images captured with the present optical inspection device. Alternatively, images captured by the optical inspection device when the hull is known or believed to be sound can be compared against subsequently acquired images to determine whether there is a change to the hull at a particular location. Changes to the hull as detected by comparison of images can trigger use of other imaging technologies (such as crack identification, for example) to determine the nature of the change. Alternatively, changes to the hull as detected by comparison of images can trigger use of other non-imaging inspection technologies or can transmit an alert to a user to perform a manual inspection.

In one embodiment, the inspection can include a paint integrity inspection. For example, optical/visual detection can be performed, similarly to the optical inspection described above, to determine the integrity of the paint and/or whether the condition of the paint has changed from previous inspections. For example, the optical detection can determine whether paint is missing or damaged or discolored using imaging technologies. In another example, the paint inspection device can include a plurality of electrodes for performing conduction detection. In one example, each of the plurality electrodes can be similar to the displacement gauge illustrated in FIG. 8 where the roller is replaced with an electrode that is spring loaded to adjust to contours of the hull. The electrodes can have a space therebetween and can be positioned or positionable in contact with the hull. An amount of electrical current conducted between the electrodes will be different depending on the presence or absence of paint on the hull. For example, electrical resistance between the electrodes will be less if paint is missing from the hull.

As another example, the paint inspection device can include a plurality of electrodes for performing paint capacitance inspection. With paint capacitance inspection, the capacitance of the paint is measured using a plurality of electrodes positioned or positionable in contact with the hull. The capacitance between the electrodes will likely be different for painted areas of the hull as compared with non-painted areas of the hull.

Another example of paint inspection includes ultrasonic paint inspection, which can be performed similarly to the ultrasonic hull inspection methods described herein.

In any of the examples described above, inspection of a known (and often desirable) hull state can be measured and established as a standard against which subsequent measurements are compared. If the subsequent measurements deviate from the standard, or deviate from the standard greater than a predetermined amount, then a change can be detected and either further inspection operations can be performed or a user can be notified that remedial actions are desired for a particular area of the hull.

In another exemplary embodiment, the autonomous inspection system detecting a state of or near a portion of the hull and comparing the detected state with a stored state of the portion of the hull can comprise making a comparison of a present output signal with what an undamaged hull would produce as an output signal, thus eliminating the need to know where the robot is on the hull of the vessel. In other words, this can comprise detecting a state of or near a portion of the hull that is discrepant with undamaged hull material. As an example, the robot could image a section of the hull (i.e., by way of an optical inspection) where a crack is discovered, and know that such a crack should not be present at that location. This can be done regardless of what part of the hull the robot is operating on.

Figure 11:
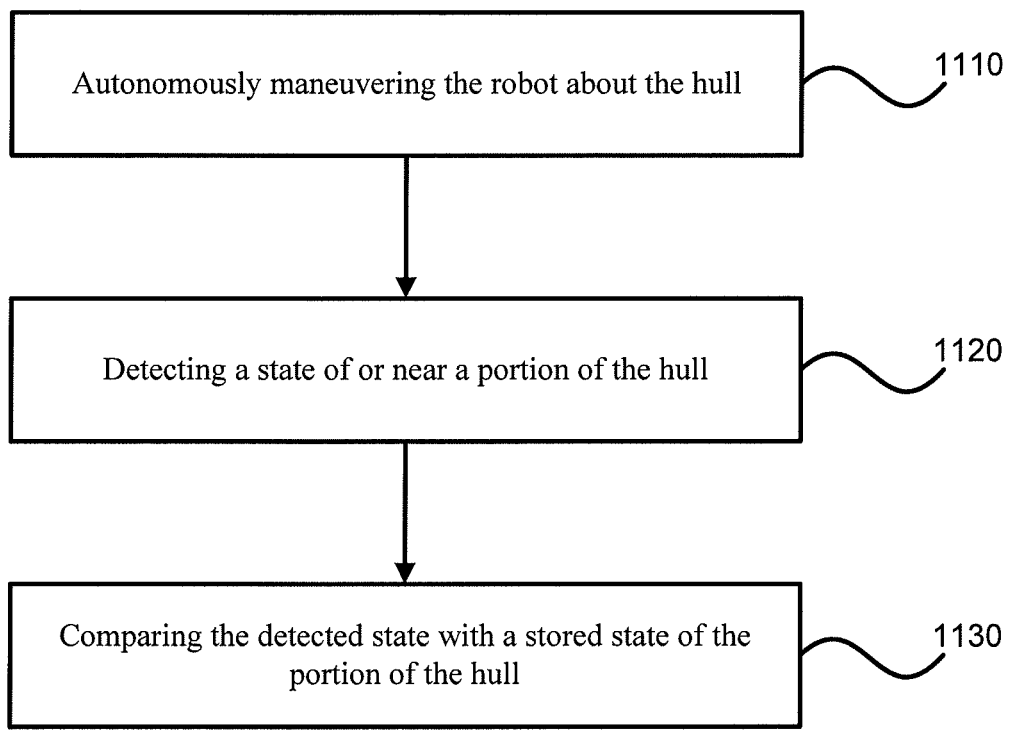
FIG. 11 is a flow diagram of a method for autonomously inspecting a hull in accordance with an example of the present technology.

Referring now to FIG. 11, a flow diagram of a method of autonomous hull inspection is illustrated in accordance with an example. The method includes autonomously maneuvering 1110 the robot about the hull. A state of or near a portion of the hull can be detected 1120. The detected state can be compared 1130 with a stored state of the portion of the hull. Based on the comparison, the robot can determine whether a change in the state or integrity of the hull has occurred and whether further action is to be taken, such as to notify a user. In some examples, the change may be an insignificant change and notification of the user may not be necessary. This determination can be made by the robot using established acceptable parameters made available to the hull robot.

The method can include various inspection systems and methods, such as detecting an eddy current near the hull, detecting a magnetic field near the hull, detecting a paint integrity of paint on the hull, optically detecting paint integrity, detecting an electrical conduction or capacitance of the paint, detecting an ultrasonic signature of the hull, or a combination of these.

Figure 12:
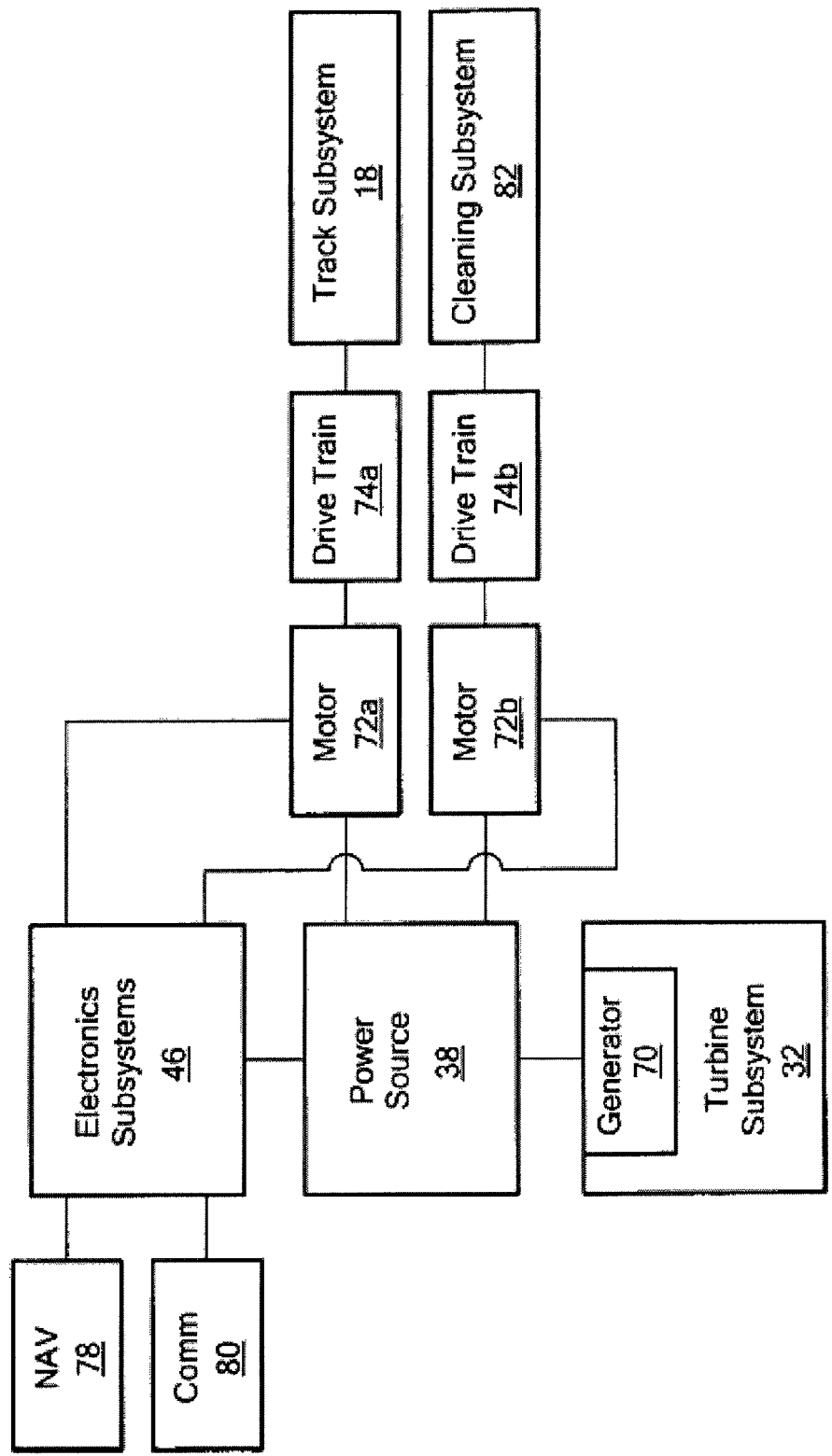
FIGS. 12-13 are system diagrams of hull cleaning robots in accordance with embodiments of the present technology.

FIG. 12, illustrates a block diagram of an example embodiment of the subject technology where turbine subsystem 32 (including one or more devices actuatable by fluid flowing past the hull) includes a generator 70 which recharges power source 38. One or more motors such as motors 72a and 72b can be powered by power source 38. Motor 72a can drive track subsystem 18 via drive train 74a. The direction of travel of the robot can be reversed via electronic control subsystem 76 which is configured to reverse the direction of motor 72a based on inputs, for example, from navigation subsystem 78 and/or communication subsystem 80. Electronic controller 76 is also powered by power source 38. Similarly, motor 72b drives cleaning subsystem 82 (e.g., one or more brushes) via drive train 74b. Motor 72b is also energized by power source 38. In other embodiments, the one or more motors may operate on the basis of a power source other than electricity. Motors are known, for example, that are fluid driven. The turbine subsystem, then, may pump fluid under pressure to the motors. If the cleaning subsystem is passive, e.g., a pad and/or a squeegee, motor 72b and drive train 74b would not be required.

Figure 13:
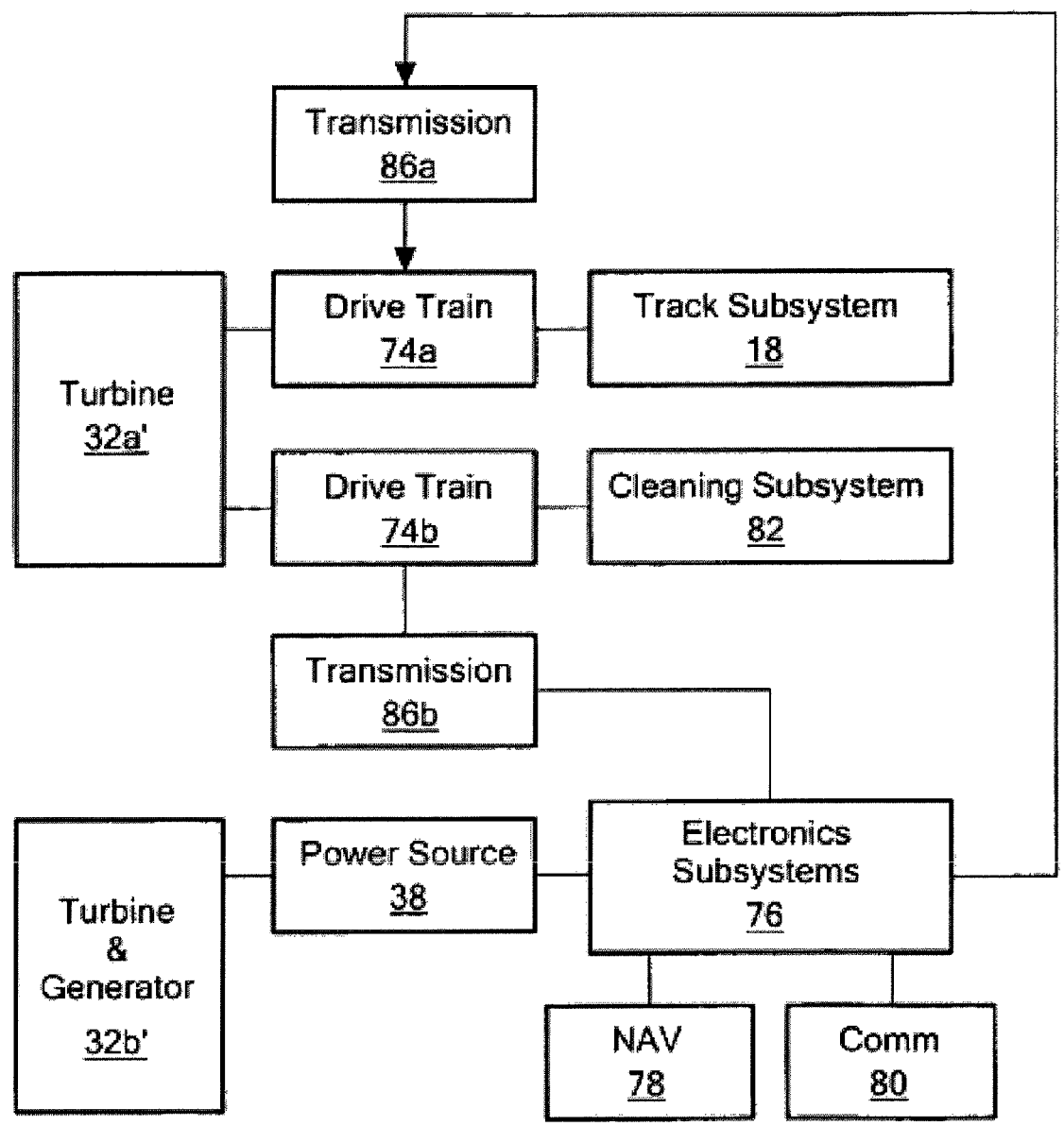

FIG. 13 illustrates a more direct drive embodiment where turbine 32a', via drive train 74a, drives drive subsystem 18. Turbine 32a, via drive train 74b, also drives cleaning subsystem 82 if it is active. Transmission 86a, under the control of electronic controller subsystem 76, may be associated with drive train 74a to control the operation, speed, and direction of the track subsystem 18. Similarly, transmission 86b, under the control of electronic subsystem 76, may be used to adjust the operation of cleaning subsystem 82.

Typically, as described regarding FIGS. 1-2, robot 10, is oriented with the intake of turbines 32a and 32b facing the direction of the water flowing past hull 12 as shown by vector 14. Hull 12 is moving in the direction of vector 22. Under power derived from turbine 32a and/or 32b, robot 10 moves along path 24 at a fairly slow velocity, e.g., a velocity much slower than the speed of the vessel. Near the edge of the vessel hull, robot 10 may turn slightly, stop, and then reverse direction. The direction of the motor operating the robot drive subsystem can be reversed or a transmission subsystem can be employed, as discussed above. In this way, the water flow direction is into the robot turbine intakes. Typically, the robot, and its various subsystems (e.g., cleaning and inspection subsystems) is controlled by software and/or circuitry 46 (FIG. 12) associated with a control module.

Figure 14:
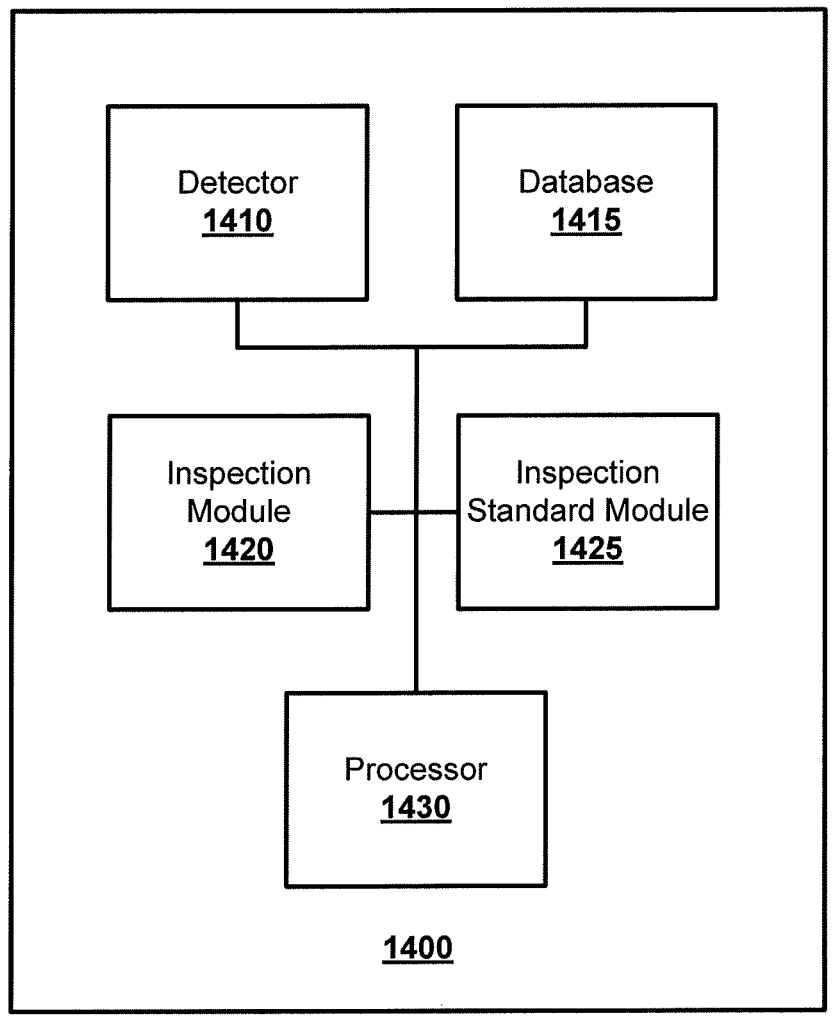
FIG. 14 is a block diagram of a hull inspection system in accordance with embodiments of the present technology.

Referring back to FIG. 13, in general, the robot platform power plant or power source 38 can include some kind of power scavenging system or subsystem, such as a turbine subsystem 32b' as discussed above. The turbines used could include a shaft rotated by vanes attached to the shaft or the turbine could include other structure activated by moving fluid, e.g., impellers and the like. Robot drive subsystem 18, 74a, 74b may include the at least one magnetic track disclosed above or other means for adhering the robot to the hull. Typically, there is some kind of a cleaning subsystem 82 such as the brushes discussed above. A navigation system 78 and a communication system 80 are also typically provided. In some embodiments, the robot platform includes an inspection subsystem 1420 (FIG. 14). A computerized control subsystem (i.e., electronics subsystem) 76 can be configured to operate these various subsystems.

The computerized control subsystem can be used in operating the inspection systems, the cleaning elements or the magnetic track(s), or in navigating the robot. The computerized control subsystem can further be used in inspecting the vessel hull.

In accordance with another example, an autonomous hull inspection system is included in the computerized control subsystem. Referring to FIG. 14, the inspection system 1400 can include a non-destructive detector 1410 onboard a device navigable over a hull of a vessel. A database 1415 onboard the device is in communication with the detector and is configured to store inspection data obtained by the detector. The database can be stored on a non-transitory computer readable storage medium. An inspection standard module 1425 can be in communication with the detector and the database and can establish a hull standard state by storing the hull inspection data obtained by the detector in the database. An inspection module 1420 can be in communication with the detector and the database and can store the hull inspection data obtained by the detector in the database after the hull standard state has been established by the inspection standard module to identify a current hull state. A processor 1420 onboard the device can be in communication with the database and can compare the hull standard state with the current hull state.

The detector, the inspection standard module, and the inspection module can be part of an autonomous inspection system operable with or on the hull robot. The autonomous inspection system can more specifically include an ultrasonic inspection system or device, an eddy current detection system or device, a magnetic field detection system or device, a displacement gauge, a mapping subsystem or device for creating a hull map based on output of the displacement gauge, an optical interferometry system or device, a paint integrity inspection system or device, an optical inspection system or device, an electrical conduction system or device, a paint capacitance system or device, and so forth, as has been described herein. In one aspect, the mapping subsystem may be configured to create a map of the hull based on ultrasonic signatures of portions of the hull detected while inspecting the hull with the ultrasonic inspection system; displacements measured using the displacement gauge while traversing the hull; magnetic fields detected using the magnetic field detection system while traversing the hull; as well as signatures, identifying features or fields using the other devices and methods for detecting, measuring and recording eddy currents, paint integrity, electrical conduction, paint capacitance, electrical conduction and so forth. The autonomous inspection system can be a modular and/or removable component of a hull cleaning robot.

A variety of inspection, computing, communication, and navigation subsystems are possible in connection with a hull cleaning and/or inspection system in accordance with the subject technology.

The result, in one embodiment, is a hull robot operable to inspect the hull of a vessel in a continuous fashion while the vessel is underway to quickly identify changes in a hull that may warrant remedial action. This early detection capability can result in cost and time savings because a problem can be addressed early on before becoming a larger, more serious problem, and because identification of structural integrity issues in the hull can lead to less time at port and reduced risks of sinking or damaging the vessel.

In one aspect, a velocity threshold may exist for passing fluid to actuate drive subsystems, cleaning subsystems, energy extraction devices and so forth. A velocity of passing fluid may be a result of the vessel to which the hull robot is attached being in motion at a velocity meeting or exceeding a pre-determined velocity or the velocity threshold.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. For example, the examples discussed herein relate primarily to vessels operating in the water. The body of other structures, however, may be cleaned, inspected, or the like, using a version of the robot disclosed herein.

The methods and systems of certain examples may be implemented in hardware, software, firmware, or combinations thereof. The methods disclosed herein can be implemented as software or firmware that is stored in a memory and that is executed by a suitable instruction execution system (e.g., a processor). If implemented in hardware, the methods disclosed herein can be implemented with any suitable technology that is well known in the art.

Also within the scope of this disclosure is the implementation of a program or code that can be stored in a non-transitory machine-readable medium to permit a computer or processor to perform any of the methods described above.

Some of the functional units described in this specification have been labeled as modules, in order to more particularly emphasize their implementation independence. The various modules, engines, tools, etc., discussed herein may be, for example, software, firmware, commands, data files, programs, code, instructions, or the like, and may also include suitable mechanisms. For example, a module may be implemented as a hardware circuit comprising custom VLSI (very large scale integration) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A hull inspection robot for autonomously inspecting a hull, comprising:
    a robot body;
    a drive subsystem onboard the robot for driving and maneuvering the robot about the hull; and
    an autonomous inspection system having
        a non-destructive detector onboard the robot body configured to non-destructively inspect the hull by detecting a state of or near a portion of the hull,
        a database onboard the robot body and in communication with the detector and configured to store the state of the portion of the hull obtained by the detector, and
        a processor onboard the robot body and in communication with the database, the processor being configured to compare the detected state with a stored state of the portion of the hull.

2. The robot according to claim 1, wherein the non-destructive detector comprises an ultrasonic inspection system.

3. The robot according to claim 1, wherein the non-destructive detector comprises an eddy current detection system.

4. The robot according to claim 1, wherein the non-destructive detector comprises a magnetic field detection system.

5. The robot according to claim 1, wherein the non-destructive detector comprises a displacement gauge.

6. The robot according to claim 5, further comprising a mapping system for creating a hull map based on output of the displacement gauge.

7. The robot according to claim 1, wherein the non-destructive detector comprises an optical interferometry system.

8. The robot according to claim 1, wherein the non-destructive detector comprises a paint integrity inspection system.

9. The robot according to claim 8, wherein the paint integrity inspection system comprises an optical inspection system.

10. The robot according to claim 8, wherein the paint integrity inspection system comprises an electrical conduction system.

11. The robot according to claim 8, wherein the paint integrity inspection system comprises a paint capacitance system.

12. The robot according to claim 1, wherein the autonomous inspection system is a modular removable component of a hull cleaning robot.

13. The robot according to claim 1, wherein the non-destructive detector comprises an acoustic emission-based inspection system.

14. The robot according to claim 1, further comprising a cleaning subsystem, wherein inspection of the hull by the autonomous inspection system is combined with a cleaning function by the cleaning subsystem.

15. The robot according to claim 14, wherein the cleaning function is carried out coincident with the inspection.

16. A method for autonomously inspecting a hull with a robot, comprising:
    autonomously maneuvering the robot about the hull;
    detecting a state of or near a portion of the hull with a non-destructive detector onboard the robot;
    storing the state of the portion of the hull obtained by the detector in a database in communication with the detector and onboard the robot body; and
    comparing the detected state with a stored state of the portion of the hull using a processor in communication with the database and onboard the robot body.

17. The method according to claim 16, wherein detecting the state comprises detecting an eddy current near the hull.

18. The method according to claim 16, wherein detecting the state comprises detecting a magnetic field near the hull.

19. The method according to claim 16, wherein detecting the state comprises detecting a paint integrity of paint on the hull.

20. The method according to claim 19, wherein detecting the paint integrity comprises optically detecting the paint integrity.

21. The method according to claim 19, wherein detecting the paint integrity comprises detecting an electrical conduction or capacitance of the paint.

22. The method according to claim 16, wherein detecting the state comprises detecting an ultrasonic signature of the hull.

23. The method according to claim 16, further comprising performing a cleaning function with the detecting of a state of or near a portion of the hull.

24. An autonomous hull inspection system, comprising:
    a non-destructive detector onboard a device navigable over a hull of a vessel;
    a database onboard the device and in communication with the detector and configured to store hull inspection data obtained by the detector;
    an inspection standard module in communication with the detector and the database, the inspection standard module being configured to establish a hull standard state by storing the hull inspection data obtained by the detector in the database;
    an inspection module in communication with the detector and the database, the inspection module being configured to store the hull inspection data obtained by the detector in the database after the hull standard state has been established by the inspection standard module to identify a current hull state; and
    a processor onboard the device and in communication with the database, the processor being configured to compare the hull standard state with the current hull state.

25. A hull inspection robot for autonomously inspecting a hull of a vessel in motion, comprising:
    a robot body;
    a drive subsystem onboard the robot for driving and maneuvering the robot about the hull;
    an autonomous inspection system having
        an ultrasonic inspection system onboard the robot body configured to non-destructively inspect the hull by detecting a state of or near a portion of the hull while the vessel is in motion and while the drive subsystem drives and maneuvers the robot about the hull,
        a database onboard the robot body and in communication with the ultrasonic inspection system and configured to store the state of the portion of the hull obtained by the ultrasonic inspection system, and
        a processor onboard the robot body and in communication with the ultrasonic inspection system, the processor being configured to compare the detected state with the stored state of the portion of the hull; and
    a mapping subsystem configured to create a map of the hull based on ultrasonic signatures of portions of the hull detected while inspecting the hull with the autonomous inspection system.

26. A hull inspection robot for autonomously inspecting a hull, comprising:
    a robot body;
    a drive subsystem onboard the robot for driving and maneuvering the robot about the hull; and
    an autonomous inspection system having
        a non-destructive detector onboard the robot body configured to non-destructively inspect the hull by detecting a state of or near a portion of the hull,
        a database onboard the robot body and in communication with the detector and configured to store the state of the portion of the hull obtained by the detector, and
        a processor onboard the robot body and in communication with the database, the processor being configured to determine whether the state of the portion of the hull obtained by the detector is discrepant with undamaged hull material.

* * * * *